US011917455B2

United States Patent
Nakahira et al.

(10) Patent No.: US 11,917,455 B2
(45) Date of Patent: Feb. 27, 2024

(54) TRANSMISSION PARAMETER CONTROL METHOD, CONTROL STATION AND RADIO BASE STATION

(71) Applicant: NIPPON TELEGRAPH AND TELEPHONE CORPORATION, Tokyo (JP)

(72) Inventors: Toshiro Nakahira, Musashino (JP); Tomoki Murakami, Musashino (JP); Hirantha Abeysekera, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 87 days.

(21) Appl. No.: 17/441,743

(22) PCT Filed: Mar. 16, 2020

(86) PCT No.: PCT/JP2020/011493
§ 371 (c)(1),
(2) Date: Sep. 22, 2021

(87) PCT Pub. No.: WO2020/196038
PCT Pub. Date: Oct. 1, 2020

(65) Prior Publication Data
US 2022/0182887 A1 Jun. 9, 2022

(30) Foreign Application Priority Data
Mar. 28, 2019 (JP) .................. 2019-063477

(51) Int. Cl.
*H04W 28/22* (2009.01)

(52) U.S. Cl.
CPC .................. *H04W 28/22* (2013.01)

(58) Field of Classification Search
None
See application file for complete search history.

(56) References Cited

U.S. PATENT DOCUMENTS 8,787,405 B1 * 7/2014 Bagchi .................. H04W 28/22
455/452.2
2007/0211720 A1 * 9/2007 Fuchs .................. H04L 12/1836
370/390

(Continued)

FOREIGN PATENT DOCUMENTS

JP 2010130134 A 6/2010

OTHER PUBLICATIONS

Part 11: Wireless LAN Medium Access Control (MAC) and Physical Layer (PHY) Specifications, IEEE Std 802.11-2016 IEEE Standard for Information technology—Telecommunications and information exchange between systems Local and metropolitan area networks—Specific requirements, Dec. 2016.

*Primary Examiner* — Kenny S Lin

(57) ABSTRACT

The invention of the present application provides a transmission parameter control method in a radio communication system that performs, between a radio base station and a plurality of radio terminal stations, communication of a first method in which reception confirmation is enabled and communication of a second method in which reception confirmation is not possible. The radio base station selects transmission parameters including a transmission rate in the communication of the second method with the radio terminal stations, based on radio communication information in the communication of the first method with the radio terminal stations.

8 Claims, 7 Drawing Sheets

(56) References Cited

U.S. PATENT DOCUMENTS

| | | | |
|---|---|---|---|
| 2008/0184087 A1* | 7/2008 | Hayashi | H04L 1/1825 714/751 |
| 2009/0016229 A1* | 1/2009 | Wu | H04W 72/542 370/252 |
| 2009/0247180 A1* | 10/2009 | Higuchi | H04L 1/0026 455/452.2 |
| 2012/0314595 A1* | 12/2012 | Oikawa | H04L 1/18 370/252 |
| 2014/0376376 A1* | 12/2014 | Bejerano | H04L 47/263 370/235 |
| 2017/0289990 A1* | 10/2017 | Kaushik | H04L 12/4625 |
| 2019/0306070 A1* | 10/2019 | Zheng | H04L 1/0007 |
| 2020/0267691 A1* | 8/2020 | Maeder | H04W 76/40 |

\* cited by examiner

Fig. 3

| TRANSMISSION PARAMETER (MCS index) | TRANSMISSION (DOWNLINK) | | | RECEPTION (UPLINK) | | |
|---|---|---|---|---|---|---|
| | NUMBER OF TRANSMISSION PACKETS | NUMBER OF RETRANSMISSION PACKETS | ... | NUMBER OF RECEPTION PACKETS | NUMBER OF RETRANSMISSION PACKETS | ... |
| 0 | 0 | 0 | ... | 0 | 0 | ... |
| 1 | 2 | 2 | ... | 103 | 38 | ... |
| 2 | 19540 | 38 | ... | 34278 | 892 | ... |
| 3 | 1835 | 90 | ... | 323 | 32 | ... |
| ... | ... | ... | ... | ... | ... | ... |
| ... | ... | ... | ... | ... | ... | ... |
| TOTAL | 785341 | 934 | ... | 92345 | 8934 | ... |

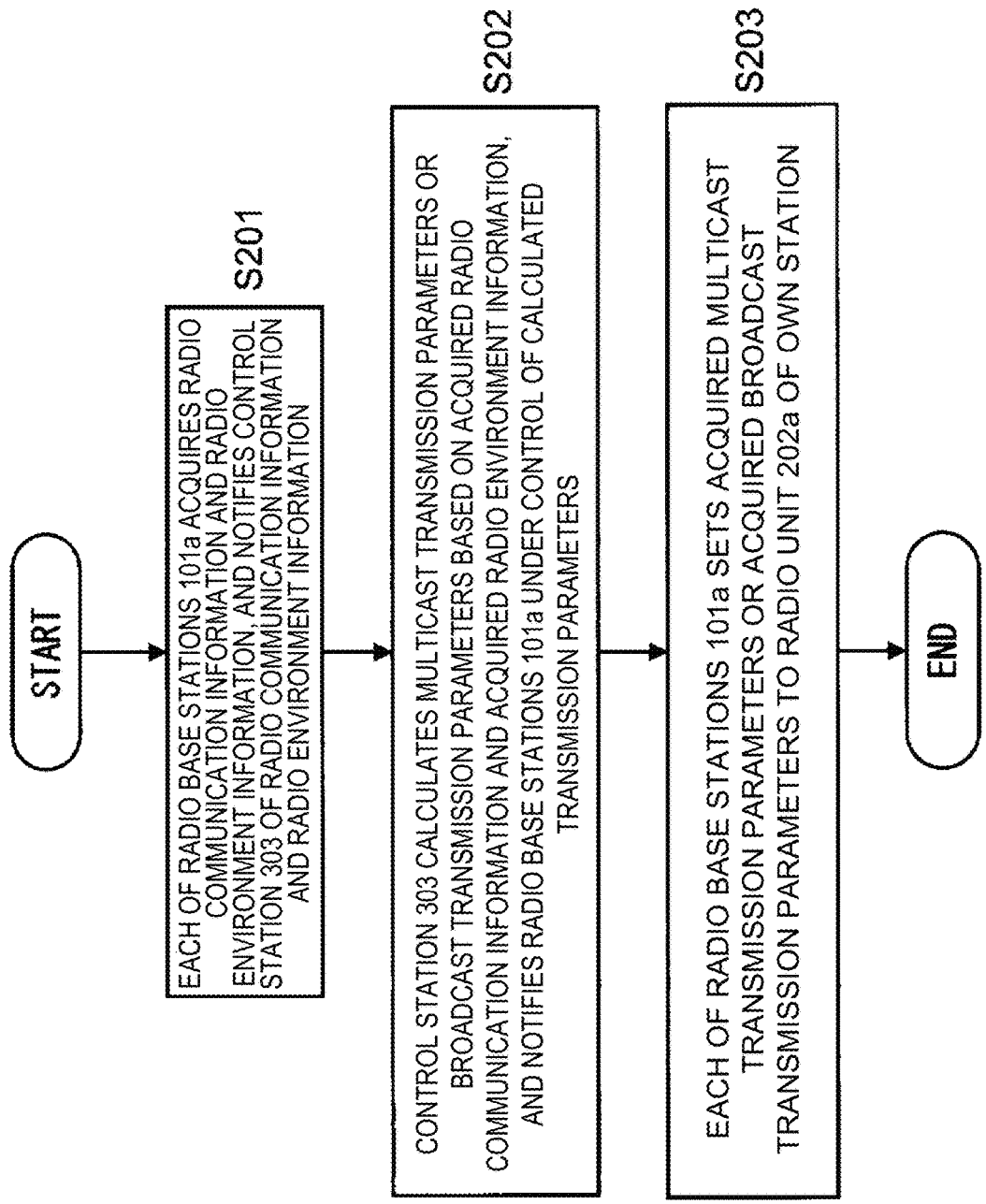

TRANSMISSION PARAMETER CONTROL METHOD, CONTROL STATION AND RADIO BASE STATION

CROSS-REFERENCE TO RELATED APPLICATIONS

This application is a 371 U.S. National Phase of International Application No. PCT/JP2020/011493 filed on Mar. 16, 2020, which claims priority to Japanese Application No. 2019-063477 filed on Mar. 28, 2019. The entire disclosures of the above applications are incorporated herein by reference.

TECHNICAL FIELD

The present invention relates to a transmission parameter control method, a control station, and a radio base station.

BACKGROUND ART

As a high-speed radio access system using radio waves in 2.4 GHz band or in 5 GHz band, a system based on IEEE802.11a standard, IEEE802.11g standard, or other standards has been used. The system uses an orthogonal frequency division multiplexing (OFDM) modulation system to stabilize communication characteristics in a multipath fading environment, thereby realizing transmission speed of up to 54 Mbit/s.

A high-speed radio access system based on IEEE802.11n standard uses a MIMO (multiple input multiple output) technology or a channel bonding technology, thereby realizing transmission speed of up to 600 Mbit/s. In the MIMO technology, a plurality of antennae are used to perform space-division multiplexing through the same radio channel in 2.4 GHz band or 5 GHz band. In the channel bonding technology, two frequency channels of 20 MHz are simultaneously used to use a frequency channel of 40 MHz.

Further, a high-speed radio access system based on IEEE802.11ac standard uses the channel bonding technology, a multiuser MIMO technology, etc., thereby realizing high-speed and high-efficiency radio communication more than IEEE802.11n standard (for example, see Non-Patent Literature 1). In the channel bonding technology, eight frequency channels of 20 MHz are simultaneously used as a frequency channel of up to 160 MHz in 5 GHz band. In the multiuser MIMO technology, different signals are simultaneously transmitted to a plurality of destinations through the same radio channel.

Communication by a radio communication system includes unicast communication in which reception confirmation is enabled between a radio base station and a radio terminal station, and multicast communication and broadcast communication in which reception confirmation is not possible. The multicast communication and the broadcast communication are used to transmit the same data to a plurality of or all of users, for example, in spread of notification information and simultaneous moving image distribution.

CITATION LIST

Non-Patent Literature

Non-Patent Literature 1: IEEE802.11-2016 standard

SUMMARY OF THE INVENTION

Technical Problem

In a case where the radio communication system performs the multicast communication or the broadcast communication, a plurality of or an unspecified large number of terminals serve as reception stations. Therefore, there is an issue that reception responses (Ack signals) are not transmitted from the reception stations, and it is difficult for a transmission station to instantaneously determine whether transmitted radio signals are correctly received by the reception stations and to retransmit the radio signals. Thus, in the multicast communication and the broadcast communication, it is necessary to prevent communication error, and the radio signals are accordingly transmitted at the lowest transmission rate (for example, at basic rate in wireless LAN) defined for the communication performed by a radio base station. However, since the transmission rate is low, transmission of the data having an equivalent capacity takes a lot of time, which causes deterioration of communication efficiency. In contrast, in a case where the transmission rate is intentionally set high, reception error may occur on the reception side. In the unicast communication, the transmission rate can be optimized based on the reception response from the reception station, whereas in the multicast communication and the broadcast communication, such a mechanism cannot be used, and optimization of the transmission rate is difficult. Note that transmission parameters to be optimized include not only the transmission rate but also a modulation level, a length of guard interval, the number of transmission streams, a bandwidth, or an error correction method, etc.

An object of the present invention is to provide a transmission parameter control method, a control station, and a radio base station that optimize the transmission parameters in communication of a second method in which reception confirmation is not possible based on radio communication information in communication of a first method in which reception confirmation is enabled and radio environment information about communication except own station, thereby improving radio communication efficiency.

Means for Solving the Problem

According to a first invention, there is provided a transmission parameter control method in a radio communication system that performs, between a radio base station and a plurality of radio terminal stations, communication of a first method in which reception confirmation is enabled and communication of a second method in which reception confirmation is not possible. The radio base station selects transmission parameters including a transmission rate in the communication of the second method with the radio terminal stations, based on radio communication information in the communication of the first method with the radio terminal stations.

According to a second invention, in the first invention, the radio base station selects, as the transmission rate in the communication of the second method, a lowest transmission rate among transmission rates in the communication of the first method with the radio terminal stations.

According to a third invention, in the first invention or the second invention, the communication of the first method is unicast communication, and the communication of the second method is multicast communication or broadcast communication.

According to a fourth invention, there is a transmission parameter control method in a radio communication system that includes a plurality of radio base stations and a control station. Each of the radio base stations performs, with a plurality of radio terminal stations, communication of a first method in which reception confirmation is enabled and communication of a second method in which reception confirmation is not possible. The control station controls the radio base stations. Each of the radio base stations collects radio communication information in the communication of the first method with the radio terminal stations and radio environment information about radio communication except own station, transmits the collected information to the control station, and receives, from the control station, transmission parameters including a transmission rate in the communication of the second method with the radio terminal stations. The control station determines the transmission parameters including the transmission rate in the communication of the second method between each of the radio base stations and the radio terminal stations based on the radio communication information and the radio environment information received from the radio base stations, and transmits the transmission parameters to the radio base stations.

According to a fifth invention, in the fourth invention, the control station determines, as the transmission rate in the communication of the second method, a lowest transmission rate among transmission rates in the communication of the first method between each of the radio base stations and the radio terminal stations, and transmits the determined transmission rate to the radio base stations.

According to a sixth invention, in the fourth invention or the fifth invention, the communication of the first method is unicast communication, and the communication of the second method is multicast communication or broadcast communication.

According to a seventh invention, there is provided a control station controlling a plurality of radio base stations. Each of the radio base stations performs, with a plurality of radio terminal stations, communication of a first method in which reception confirmation is enabled and communication of a second method in which reception confirmation is not possible. The control station includes: a network communication unit configured to receive radio communication information in the communication of the first method between each of the radio base stations and the radio terminal stations and radio environment information about radio communication except the radio base stations, through a network, and to transmit transmission parameters in the communication of the second method between each of the radio base stations and the radio terminal stations, to the radio base stations through the network; and an information processing unit configured to determine transmission parameters including a transmission rate in the communication of the second method between each of the radio base stations and the radio terminal stations, based on the radio communication information and the radio environment information received from the radio base stations, and to transmit the determined transmission parameters to the radio base stations.

According to an eighth invention, there is provided a radio base station performing, with a plurality of radio terminal stations, communication of a first method in which reception confirmation is enabled and communication of a second method in which reception confirmation is not possible. The radio base station includes an information collection unit configured to acquire radio communication information in the communication of the first method with the radio terminal stations. Transmission parameters including a transmission rate in the communication of the second method with the radio terminal stations are selected based on the radio communication information.

Effects of the Invention

The transmission parameter control method, the control station, and the radio base station according to the present invention each optimize the transmission parameters in the communication of the second method in which reception confirmation is not possible, based on the radio communication information in the communication of the first method in which reception confirmation is enabled and the radio environment information about the communication except the own station, thereby improving radio communication efficiency.

BRIEF DESCRIPTION OF DRAWINGS

FIG. 3 is a diagram illustrating an example of radio communication information in unicast communication.

FIG. 7 is a diagram illustrating a processing example of the control station and the radio base station according to the second embodiment.

DESCRIPTION OF EMBODIMENTS

Some embodiments of a transmission parameter control method, a control station, and a radio base station according to the present invention are described below with reference to drawings.

First Embodiment

Figure 1:
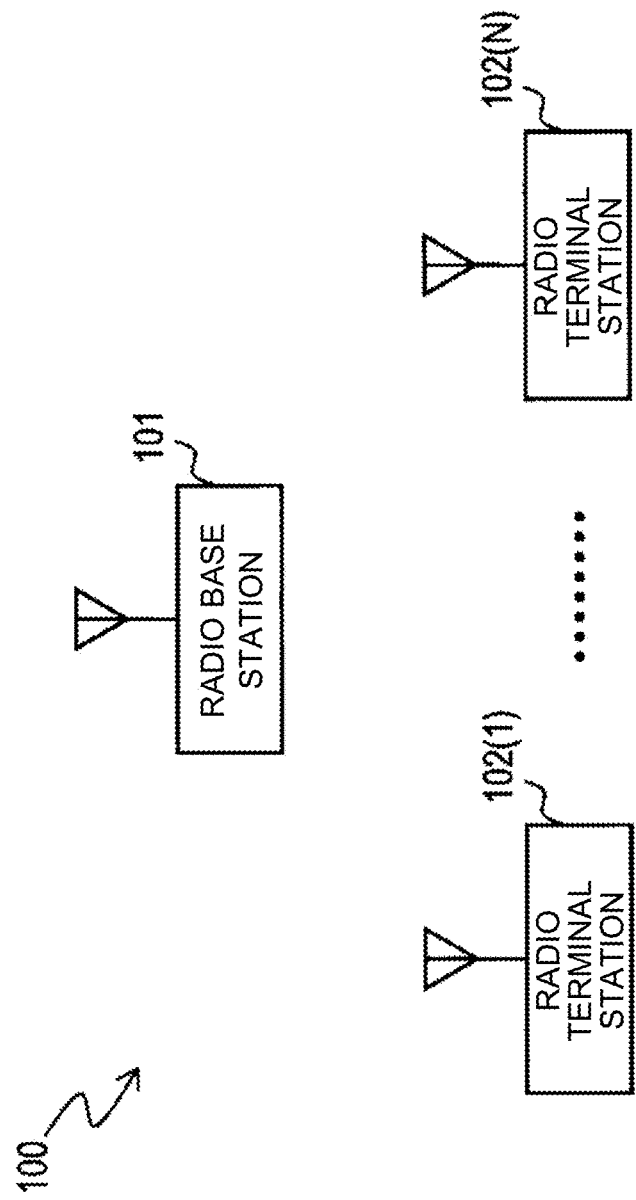
FIG. 1 is a diagram illustrating an example of a radio communication system according to a first embodiment.

FIG. 1 illustrates an example of a radio communication system 100 according to a first embodiment. In FIG. 1, the radio communication system 100 includes a radio base station 101, and radio terminal stations 102(1) to 102(N) (N is positive integer). In the following description, in a case where description common to the radio terminal stations 102(1) to 102(N) is made, the radio terminal stations 102(1) to 102(N) are referred to as radio terminal stations 102 by omitting a (number) at an end of a reference numeral. In a case where a specific radio terminal station 102 is described, the (number) is added to the end of the reference numeral, and the specific radio terminal station 102 is referred to as, for example, the radio terminal station 102(1).

In FIG. 1, the plurality of radio terminal stations 102 are each connected to the radio base station 101 by radio and perform radio communication. The radio base station 101 performs, with the plurality of radio terminal stations 102, communication of a first method in which reception confirmation is enabled and communication of a second method in which reception confirmation is not possible. Note that, in the present embodiment and the other embodiments described below, unicast communication is described as an example of the communication of the first method in which reception confirmation is enabled. Likewise, multicast communication or broadcast communication is described as an example of the communication of the second method in which reception confirmation is not possible.

Figure 2:
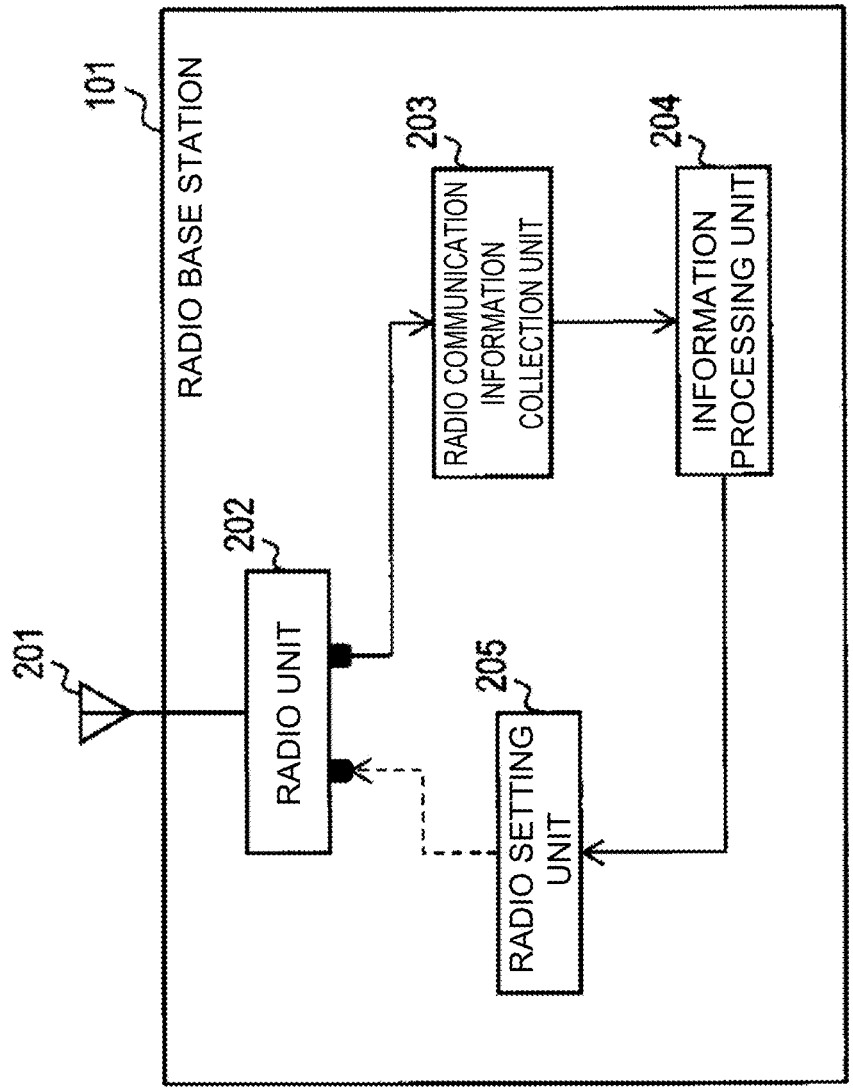
FIG. 2 is a diagram illustrating a configuration example of a radio base station according to the first embodiment.

FIG. 2 illustrates a configuration example of the radio base station 101 according to the first embodiment. In FIG. 2, the radio base station 101 includes an antenna 201, a radio unit 202, a radio communication information collection unit 203, an information processing unit 204, and a radio setting unit 205.

The antenna 201 is connected to the radio unit 202. The antenna 201 converts a radio frame output from the radio unit 202 into a radio wave and transmits the radio wave. In addition, the antenna 201 converts a radio wave transmitted from each of the radio terminal stations 102 into a radio frame, and outputs the radio frame to the radio unit 202.

The radio unit 202 has two functions of a radio communication function and a radio communication information collection function. In the radio communication function, the radio unit 202 transmits and receives the radio frame to/from each of the radio terminal stations 102 through the antenna 201 by using transmission parameters (transmission rate as main parameter, modulation level, length of guard interval, number of transmission streams, bandwidth, error correction method, etc.) set by the radio setting unit 205. In the radio communication information collection function, the radio unit 202 acquires information (radio communication information such as transmission parameters including transmission rate) about communication between each of the radio terminal stations 102 and the own station, and outputs the acquired information to the radio communication information collection unit 203. Note that a specific example of the radio communication information is described in detail below.

The radio communication information collection unit 203 collects the radio communication information with each of the radio terminal stations 102, from the radio unit 202, and outputs the radio communication information to the information processing unit 204. In the present embodiment, the radio communication information collection unit 203 collects the radio communication information about the unicast communication, and outputs the collected radio communication information to the information processing unit 204.

The information processing unit 204 acquires the radio communication information from the radio communication information collection unit 203, calculates transmission parameters for the multicast communication or transmission parameters for the broadcast communication, and outputs the calculated transmission parameters to the radio setting unit 205. A calculation method is described below.

The radio setting unit 205 acquires the transmission parameters for the multicast communication or the transmission parameters for the broadcast communication calculated by the information processing unit 204, and sets the acquired transmission parameters to the radio unit 202.

In FIG. 2, illustration of blocks of functions (e.g., routing of radio packet) mounted on a common radio base station is omitted.

As described above, the radio base station 101 according to the first embodiment acquires the information about the unicast communication as the radio communication information, and calculates the transmission parameters for the multicast communication or the transmission parameters for the broadcast communication. Therefore, it is possible to optimize the transmission parameters for the multicast communication or the broadcast communication corresponding to a communication environment, and to improve radio communication efficiency.

The radio communication information is information about the communication (in present embodiment, unicast communication) in which reception confirmation is enabled between the radio base station 101 and the radio terminal stations 102 under control.

FIG. 3 illustrates an example of the radio communication information in the unicast communication. In the example of FIG. 3, communication information in a downlink direction (in transmission) from the radio base station 101 to each of the radio terminal stations 102, and communication information in an uplink direction (in reception) from each of the radio terminal stations 102 to the radio base station 101 are acquired as the radio communication information in the unicast communication, by the radio communication information collection unit 203. The communication information in transmission is information such as the transmission parameters (MCS (modulation and coding scheme) index) including the transmission rate, the number of transmission packets, and the number of retransmission packets. Likewise, the communication information in reception is information such as the transmission parameters, the number of reception packets, and the number of retransmission packets.

In the example of FIG. 3, in a case where the MCS index is 1, the number of transmission packets in the downlink direction is 2, the number of retransmission packets in the downlink direction is 2, the number of reception packets in the uplink direction is 103, and the number of retransmission packets in the uplink direction is 38. In a case where the MCS index is 2, the number of transmission packets in the downlink direction is 19540, the number of retransmission packets in the downlink direction is 38, the number of reception packets in the uplink direction is 34278, and the number of retransmission packets in the uplink direction is 892. In the case where the MCS index is 2, the number of transmission packets and the number of reception packets are the largest in the table. In addition, a total number for all of the MCS indices of each value is determined. In the example of FIG. 3, the total number of transmission packets in the downlink direction is 785341, the total number of retransmission packets in the downlink direction is 934, the total number of reception packets in the uplink direction is 92345, and the total number of retransmission packets in the uplink direction is 8934.

As described above, the number of the packets and the number of retransmission packets in each of the uplink direction and the downlink direction for each of the transmission parameters are collected as the radio communication information in the unicast communication by the radio communication information collection unit 203, and the collected radio communication information is recorded in the radio communication information collection unit 203 or the information processing unit 204.

Figure 4:
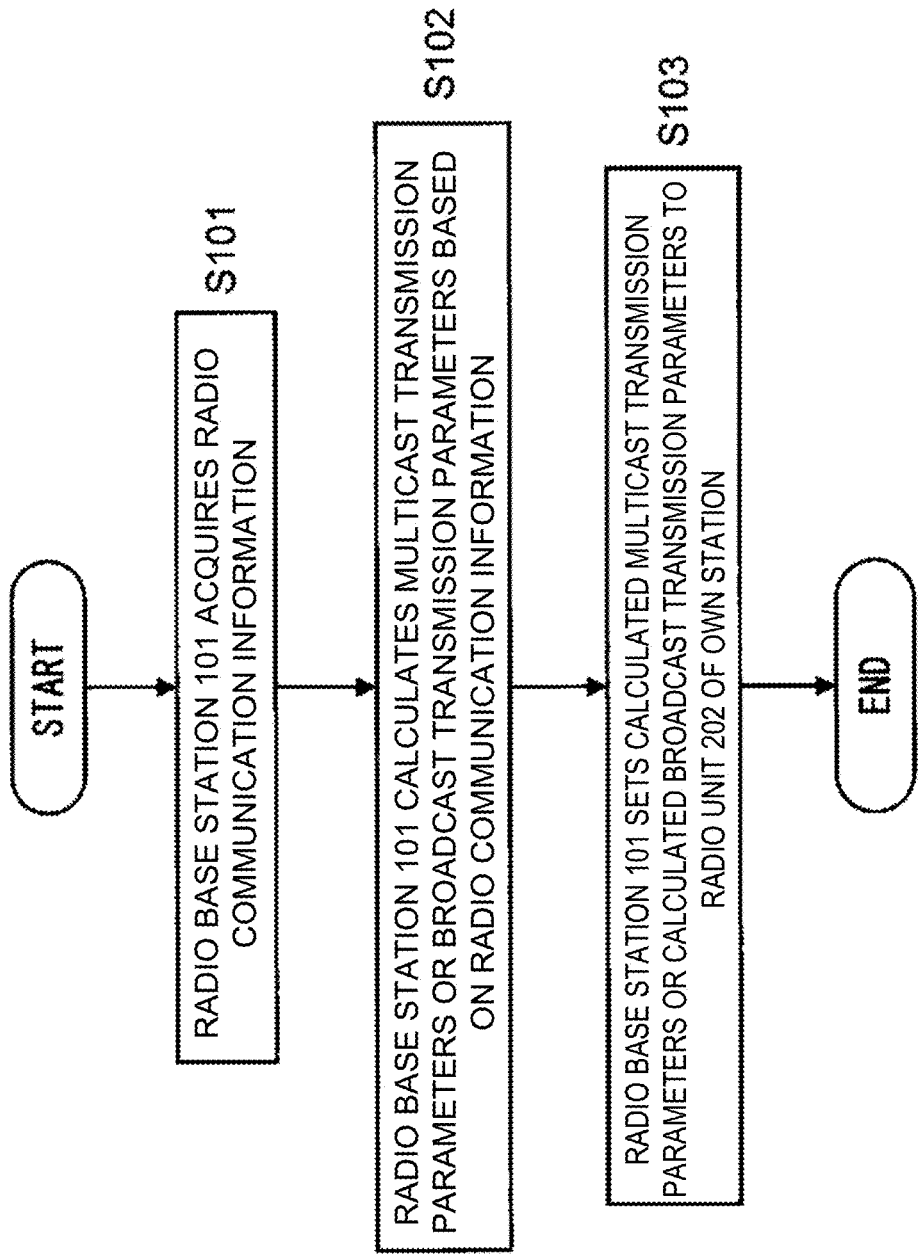
FIG. 4 is a diagram illustrating a processing example of the radio base station according to the first embodiment.

FIG. 4 illustrates a processing example of the radio base station 101 according to the first embodiment. The processing illustrated in FIG. 4 is an example of a procedure of setting the transmission parameters for the multicast communication or the transmission parameters for the broadcast communication in the radio base station 101, and is performed by the blocks of the radio base station 101 described with reference to FIG. 2.

In step S101, the radio base station 101 acquires the radio communication information about the communication of the own station (in present embodiment, radio communication information in unicast communication).

In step S102, the radio base station 101 calculates the transmission parameters for the multicast communication or the transmission parameters for the broadcast communication based on the radio communication information.

In step S103, the radio base station 101 sets the calculated transmission parameters for the multicast communication or the calculated transmission parameters for the broadcast communication, to the radio unit 202 of the own station.

In the above-described manner, the radio base station 101 according to the present embodiment can set the transmission parameters for the multicast communication or the transmission parameters for the broadcast communication, based on the radio communication information in the unicast communication. Further, even in a case where the radio communication state or the communication environment is unstable, the radio base station 101 can dynamically control and optimize the transmission parameters for the multicast communication or the broadcast communication by periodically performing the processing described with reference to FIG. 4 at a predetermined time interval, which makes it possible to improve the radio communication efficiency.

(Method of Calculating Transmission Parameters for Multicast Communication or Broadcast Communication)

Next, a method of calculating the transmission parameters for the multicast communication or the transmission parameters for the broadcast communication is described in detail.

In the method of calculating the transmission parameters for the multicast communication or the transmission parameters for the broadcast communication, for example, the transmission parameters (for example, lowest transmission rate) at which the data can be most surely transmitted among the radio communication information in the unicast communication used in the downlink direction may be selected. In the case of FIG. 3, for example, the above-described transmission parameters correspond to the transmission parameters in the case where the MCS index is 1. At this time, when the modulation level in the case where the MCS index is 1 has higher resistance against noise than the modulation level in the case where the MCS index is 2 even though the transmission rate of the transmission parameters in the case where the MCS index is 1 is equal to the transmission rate of the transmission parameters in the case where the MCS index is 2, the radio base station 101 selects the transmission parameters in the case where the MCS index is 1. Note that the transmission parameters may be simply selected based on the transmission rate without considering the transmission parameters other than the transmission rate, such as the modulation level.

In the case where the transmission rate is used, a threshold (for example, 90%) may be previously set, and the radio base station 101 may select the lowest transmission rate among the transmission rates from a higher-order transmission rate to the threshold. For example, in a case where the higher-order transmission rate is 30 Mbps, the transmission rate of 90% of 30 Mbps is 27 Mbps. Therefore, the transmission rate of the MCS index included in a range from 30 Mbps to 27 Mbps is selected.

Further, the radio base station 101 may use the transmission rate obtained by imparting a predetermined margin to the selected transmission rate. For example, in a case where the selected transmission rate is 20 Mbps and the margin is 2 Mbps that is 10% of the selected transmission rate, the transmission rate of the MCS index at which the transmission rate becomes 18 Mbps is selected.

At this time, the same values are usable as the transmission parameters for the multicast communication or the transmission parameters for the broadcast communication. Further, in a case where the radio communication information in the unicast communication about the radio terminal station 102 that joins reception of the multicast communication can be individually determined, the radio base station 101 can set the transmission parameters corresponding to the radio terminal station 102 joining the multicast communication, by setting the transmission parameters for the multicast communication with use of the information. For example, in a case where the transmission rate in the multicast communication calculated based on the radio communication information in the unicast communication about the radio terminal station 102(1) is 20 Mbps, the transmission rate in the multicast communication calculated based on the radio communication information in the unicast communication about the radio terminal station 102(2) is 15 Mbps, and the transmission rate in the multicast communication calculated based on the radio communication information in the unicast communication about the radio terminal station 102(3) is 25 Mbps, the radio base station 101 sets the transmission rate in the multicast communication to 15 Mbps.

Further, in a case where information about whether beamforming of the antenna has been adopted in transmission by the radio base station 101 can be further acquired together with the radio communication information, the radio base station 101 can calculate the transmission parameters for the multicast communication or the transmission parameters for the broadcast communication by considering reception power difference between the unicast communication using the beamforming and one of the multicast communication and the broadcast communication not using the beamforming.

Note that a frequency band and a communication standard may be different between the unicast communication and one of the multicast communication and the broadcast communication. For example, there is a case where the radio base station 101 performs the unicast communication based on IEEE802.11ac standard using 5 GHz band, and performs the multicast communication or the broadcast communication based on IEEE802.11g standard using 2.4 GHz. In such a case, the radio base station 101 can calculate more suitable transmission parameters by considering difference in the radio wave propagation characteristics caused by difference of the frequency band, and difference in usable transmission rate.

In the above-described manner, the radio communication system 100 according to the present embodiment can calculate the transmission parameters for the multicast communication or the transmission parameters for the broadcast communication based on the radio communication information in the unicast communication.

Second Embodiment

Figure 5:
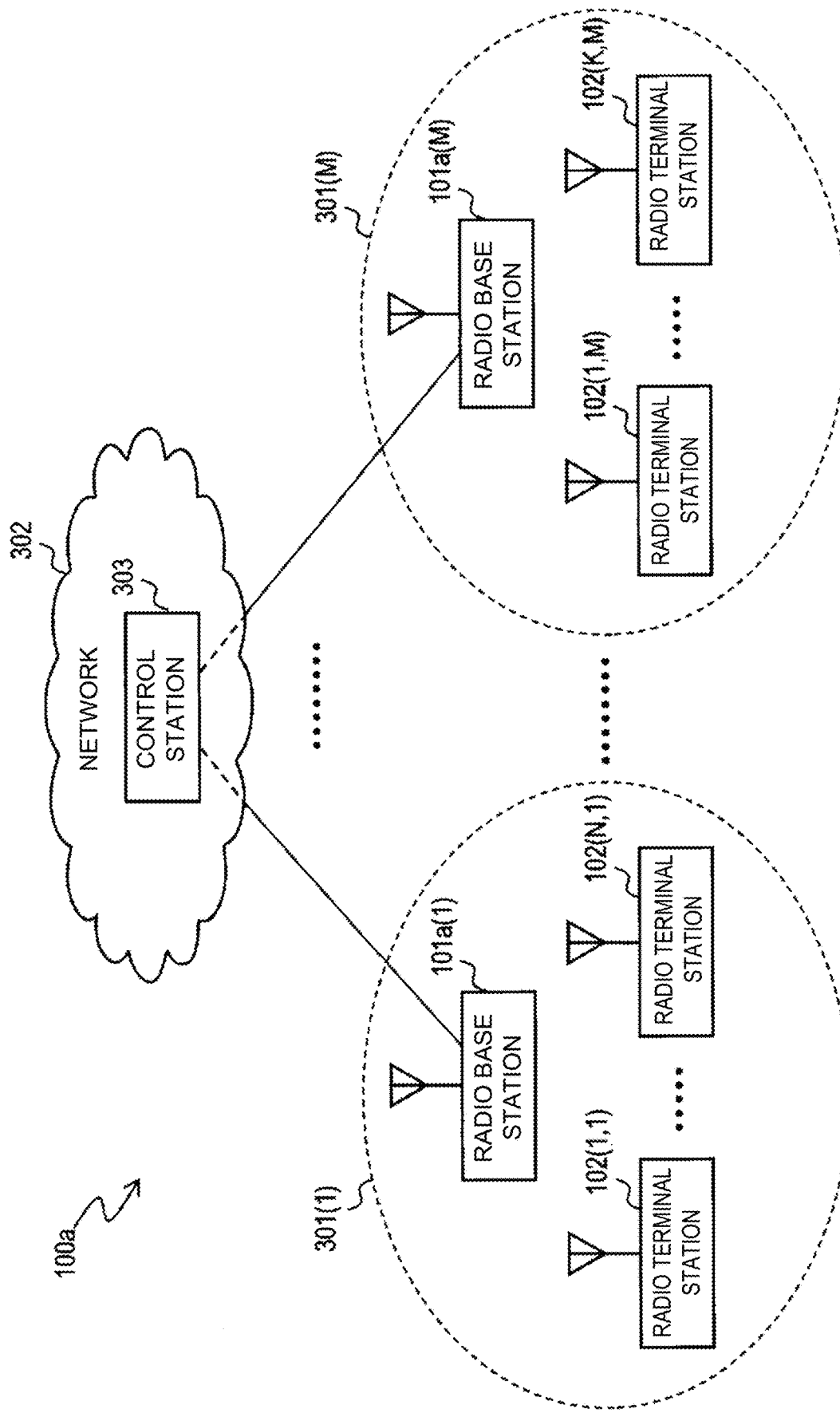
FIG. 5 is a diagram illustrating a configuration example of a radio communication system according to a second embodiment.

FIG. 5 illustrates a configuration example of a radio communication system 100a according to a second embodiment. In FIG. 5, the radio communication system 100a includes a control station 303 that controls M (M is positive integer) radio base stations 101a from a radio base station 101a(1) in a communication area 301(1) to a radio base station 101a(M) in a communication area 301(M), through a network 302.

In FIG. 5, the radio base station 101a(1) includes N (N is positive integer) radio terminal stations 102 from a radio terminal station 102(1, 1) to a radio terminal station 102(N, 1) under its control. Likewise, the radio base station 101*a*(M) includes K (K is positive integer) radio terminal stations 102 from a radio terminal station 102(1, M) to a radio terminal station 102(K, M) under its control. Note that the numbers N and K are not required to be equal to each other, and each of the radio base stations 101*a* may include the different number of radio terminal stations 102. In the following description, in a case where description common to the radio base stations 101*a*(1) to 101*a*(M) is made, the radio base stations 101*a*(1) to 101*a*(M) are referred to as the radio base stations 101*a* by omitting the (number) at an end of a reference numeral. In a case where a specific radio base station 101*a* is described, the (number) is added to the end of the reference numeral, and the specific radio base station 101*a* is referred to as, for example, the radio base station 101*a*(1). The communication areas 301(1) to 301(M) are similarly denoted. Further, in a case where description common to the radio terminal stations 102(1, 1) to 102(K, M) is made, the radio terminal stations 102(1, 1) to 102(K, M) are referred to as radio terminal stations 102 by omitting (terminal number, communication area number) at an end of a reference numeral. In a case where a specific radio terminal station 102 is described, the (terminal number, communication area number) is added to the end of the reference numeral, and the specific radio terminal station 102 is referred to as, for example, the radio terminal station 102(1, 1).

In FIG. 5, the plurality of radio terminal stations 102 in each of the communication areas 301 are each connected to the radio base station 101*a* in the corresponding communication area 301 by radio, and perform radio communication with the corresponding radio base station 101*a*. Each of the radio base stations 101*a* performs the unicast communication and one of the multicast communication and the broadcast communication with the plurality of radio terminal stations 102 under control.

Differences from the radio communication system 100 in FIG. 1 described in the first embodiment are that the control station 303 are connected to the plurality of radio base stations 101*a*, and the plurality of radio base stations 101*a* are controlled by the control station 303.

Figure 6:
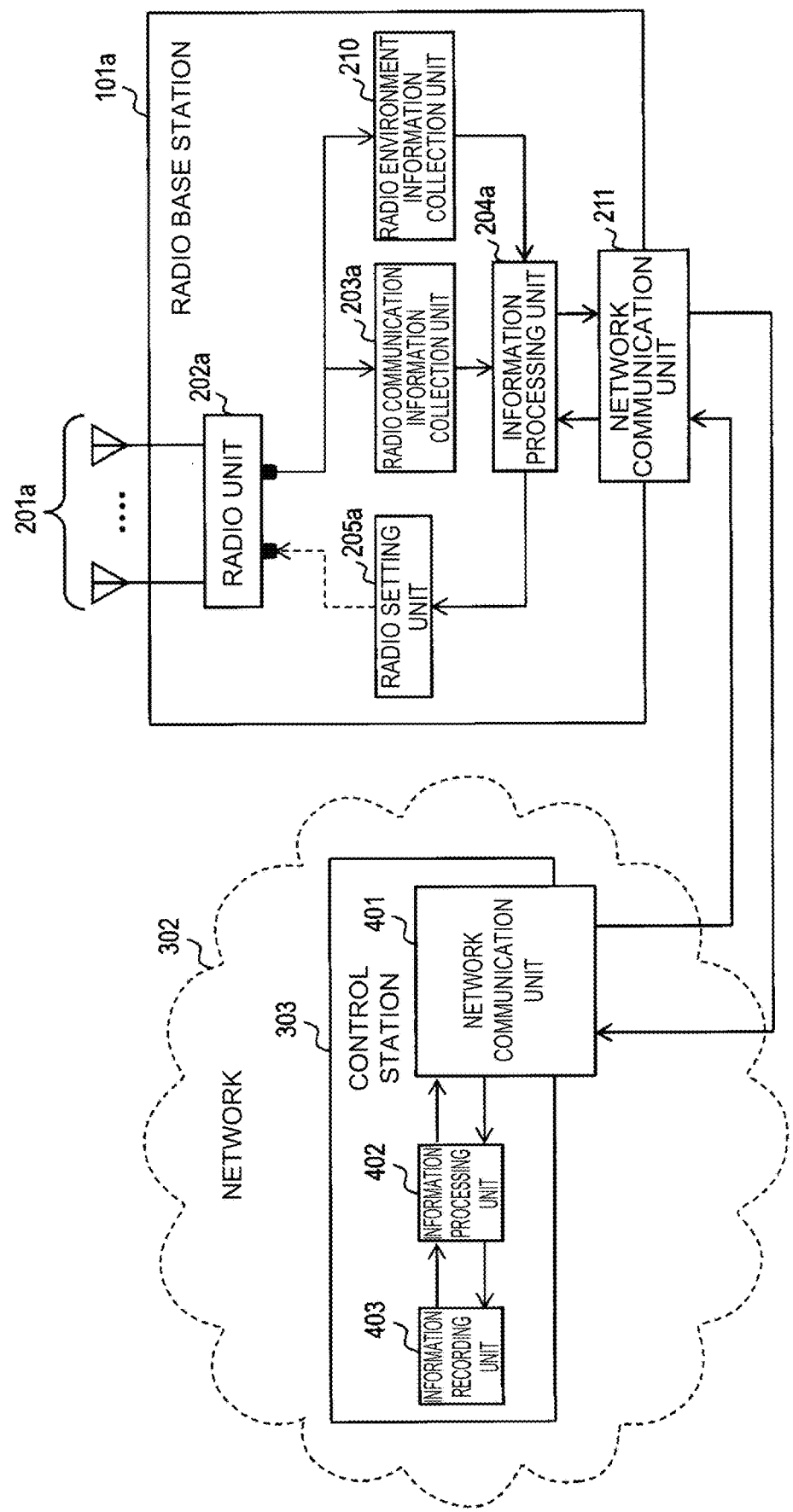
FIG. 6 is a diagram illustrating a configuration example of a control station and a radio base station according to the second embodiment.

FIG. 6 illustrates a configuration example of the control station 303 and each of the radio base stations 101*a* according to the second embodiment.

In FIG. 6, each of the radio base stations 101*a* includes an antenna 201*a*, a radio unit 202*a*, a radio communication information collection unit 203*a*, an information processing unit 204*a*, a radio setting unit 205*a*, a radio environment information collection unit 210, and a network communication unit 211. The antenna 201*a*, the radio unit 202*a*, the radio communication information collection unit 203*a*, the information processing unit 204*a*, and the radio setting unit 205*a* of each of the radio base stations 101*a* illustrated in FIG. 6 respectively correspond to the antenna 201, the radio unit 202, the radio communication information collection unit 203, the information processing unit 204, and the radio setting unit 205 of the radio base station 101 described with reference to FIG. 2, and operate in a manner similar to the respective blocks in FIG. 2. Each of the radio base stations 101*a* illustrated in FIG. 6 is different from the radio base station 101 described with reference to FIG. 2 in that each of the radio base stations 101*a* includes the radio environment information collection unit 210 and the network communication unit 211.

The radio environment information collection unit 210 collects radio environment information of the own radio base station 101*a*, and outputs the radio environment information to the information processing unit 204*a*. The radio environment information is information about communication except the own station (information about communication of other radio base stations and radio terminal stations), and can be acquired by, for example, packet capture.

The information processing unit 204*a* acquires the radio communication information from the radio communication information collection unit 203*a*, and acquires the radio environment information from the radio environment information collection unit 210. The information processing unit 204*a* is different from the information processing unit 204 illustrated in FIG. 2 in that the information processing unit 204*a* transmits the radio communication information and the radio environment information to the control station 303 through the network communication unit 211 and the network 302. Further, the information processing unit 204*a* receives the transmission parameters for the multicast communication or the transmission parameters for the broadcast communication from the control station 303 through the network 302 and the network communication unit 211, and outputs the received transmission parameters to the radio setting unit 205.

The radio setting unit 205*a* acquires the transmission parameters for the multicast communication or the transmission parameters for the broadcast communication received by the information processing unit 204*a* from the control station 303, and sets the acquired transmission parameters to the radio unit 202*a*.

The network communication unit 211 performs communication with the control station 303 connected through the network 302. For example, the network communication unit 211 transmits the radio communication information and the radio environment information acquired by the information processing unit 204 to the control station 303 through the network 302. Further, the network communication unit 211 receives the transmission parameters for the multicast communication or the transmission parameters for the broadcast communication from the control station 303 through the network 302, and outputs the received transmission parameters to the information processing unit 204*a*.

On the other hand, in FIG. 6, the control station 303 includes a network communication unit 401, an information processing unit 402, and an information recording unit 403.

The network communication unit 401 performs communication with the plurality of radio base stations 101*a* through the network 302.

The information processing unit 402 acquires the radio communication information and the radio environment information from the plurality of radio base stations 101*a* through the network communication unit 401 and the network 302, and calculates the transmission parameters for the multicast communication or the transmission parameters for the broadcast communication for each of the radio base stations 101*a* based on the radio communication information and the radio environment information. Further, the information processing unit 402 transmits the calculated transmission parameters for the multicast communication or the calculated transmission parameters for the broadcast communication to each of the radio base stations 101*a* through the network communication unit 401 and the network 302. The information processing unit 402 outputs, to the information recording unit 403, the radio communication information, the radio environment information, and the transmission parameters for the multicast communication or the transmission parameters for the broadcast communication, for each of the radio base stations 101*a*.

The information recording unit 403 records, in a recording medium such as a memory, the radio communication information, the radio environment information, and the transmission parameters for the multicast communication or the transmission parameters for the broadcast communication for each of the radio base stations 101a, output from the information processing unit 402.

As described above, each of the radio base stations 101a according to the second embodiment acquires the radio communication information in the unicast communication in which reception confirmation is enabled, and the radio environment information about the radio communication except the own station, to optimize the transmission parameters for the multicast communication or the transmission parameters for the broadcast communication in which reception confirmation is not possible, which makes it possible to improve the radio communication efficiency.

FIG. 7 illustrates a processing example of the control station 303 and each of the radio base stations 101a according to the second embodiment. The processing illustrated in FIG. 7 is an example of a procedure of setting the transmission parameters for the multicast communication or the transmission parameters for the broadcast communication in each of the radio base stations 101a, and is performed by the blocks of each of the radio base stations 101a described with reference to FIG. 6.

Differences from the processing illustrated in FIG. 4 are that the control station 303 collectively calculates the transmission parameters for the multicast communication or the transmission parameters for the broadcast communication for the plurality of radio base stations 101a, and the control station 303 notifies each of the radio base stations 101a of the calculated transmission parameters for the multicast communication or the calculated transmission parameters for the broadcast communication.

In step S201, each of the radio base stations 101a acquires the radio communication information and the radio environment information, and notifies the control station 303 of the acquired radio communication information and the acquired radio environment information.

In step S202, the control station 303 calculates the transmission parameters for the multicast communication or the transmission parameters for the broadcast communication based on the radio communication information and the radio environment information acquired from the plurality of radio base stations 101a, and notifies the radio base stations 101a under control of the calculated transmission parameters.

In step S203, each of the radio base stations 101a acquires the transmission parameters for the multicast communication or the transmission parameters for the broadcast communication from the control unit 303, and sets the acquired transmission parameters to the radio unit 202 of the own station. Each of the plurality of radio base stations 101a performs the similar processing. At this time, as the transmission parameters for the multicast communication or the transmission parameters for the broadcast communication, the transmission parameters suitable for the communication environment of the corresponding communication area 301 are set to each of the radio base stations 101a.

As described above, in the radio communication system 100a according to the present embodiment, the control station 303 connected to the plurality of radio base stations 101a through the network 302 can collectively calculate the transmission parameters for the multicast communication or the transmission parameters for the broadcast communication for each of the radio base stations 101a, based on the radio communication information with the radio terminal stations 102 under control of each of the radio base stations 101a, and can set the transmission parameters for the multicast communication or the transmission parameters for the broadcast communication to the plurality of radio base stations 101a. Further, in the radio communication system 100a according to the present embodiment, the processing described with reference to FIG. 7 is periodically performed at the predetermined time interval, which makes it possible to optimize the transmission parameters for the multicast communication or the transmission parameters for the broadcast communication, and to improve the radio communication efficiency even in the case where the radio communication state or the radio communication environment is unstable.

Note that, in the second embodiment illustrated in FIG. 5, the control station 303 may collectively perform the above-described processing on the radio communication information and the radio environment information acquired from all or some of the M radio base stations 101a from the radio base stations 101a(1) to 101a(M), and may set the same transmission parameters for the multicast communication or the same transmission parameters for the broadcast communication to all or some of the radio base stations 101a.

In the above-described embodiments, the example in which the unicast communication is used as the communication in which reception confirmation is enabled in order to acquire the transmission parameters has been described; however, communication in which acquisition of the transmission parameters other than the unicast communication is enabled may be used.

Further, the radio base station 101 and the radio terminal stations 102 in the first embodiment and the control station 303, the radio base stations 101a, and the radio terminal stations 102 in the second embodiment may be each realized by a general-purpose computer without being limited to a dedicated device. In this case, each of the stations may be implemented by recording a program for implementing the functions described in each of the embodiments in a computer-readable recording medium, and causing a computer system to read and execute the program recorded in the recording medium. The "computer system" used herein includes OS and hardware such as peripheral devices. The "computer-readable recording medium" refers to a portable medium such as a flexible disk, a magnetooptical disk, a ROM, and a CD-ROM, and a storage device such as a hard disk incorporated in the computer system. The "computer-readable recording medium" may also include a medium that dynamically holds a program for a short period of time on a communication line when the program is transmitted through a network such as the Internet, or a communication line such as a telephone line, for example, a volatile memory holding the program for a predetermined time, inside the computer system serving as a server or a client. The above-described program may implement a part of the functions described in each of the embodiments, or may implement the above-described functions in combination with a program already recorded in the computer system. For example, the program may be implemented by using hardware such as a PLD (programmable logic device) and a FPGA (field programmable gate array).

Although the embodiments of the present invention have been described with reference to the drawings, the above-described embodiments merely illustrative of the present invention, and it is obvious that the present invention is not limited to the above-described embodiments. Accordingly, addition, omission, replacement, and other modifications of components may be made without departing from the technical idea and the scope of the present invention.

REFERENCE SIGNS LIST 100, 100a Radio communication system
101, 101a Radio base station
102 Radio terminal station
201, 201a Antenna
202, 202a Radio unit
203, 203a Radio communication information collection unit
204, 204a Information processing unit
205, 205a Radio setting unit
210 Radio environment information collection unit
211 Network communication unit
301 Communication area
302 Network
303 Control station

The invention claimed is:

1. A transmission parameter control method in a radio communication system that performs, between a radio base station and a plurality of radio terminal stations, communication of a first method in which reception confirmation is enabled and communication of a second method in which reception confirmation is not possible,
wherein
the communication of the first method is unicast communication, and the communication of the second method is multicast communication or broadcast communication, and
wherein the radio base station selects transmission parameters in the communication of the second method with the radio terminal stations, based on radio communication information in the communication of the first method with the radio terminal stations,
wherein transmission parameters include all of a modulation level, a length of guard interval, a number of transmission streams, bandwidth, and an error method.

2. The transmission parameter control method according to claim 1, wherein the radio base station selects, as a transmission rate in the communication of the second method, a lowest transmission rate among transmission rates in the communication of the first method with the radio terminal stations.

3. The transmission parameter control method according to claim 1, wherein transmission parameters include a transmission rate.

4. A transmission parameter control method in a radio communication system that includes a plurality of radio base stations and a control station, each of the radio base stations performing, with a plurality of radio terminal stations, communication of a first method in which reception confirmation is enabled and communication of a second method in which reception confirmation is not possible, the control station controlling the plurality of radio base stations, wherein the communication of the first method is unicast communication, and the communication of the second method is multicast communication or broadcast communication wherein
each of the radio base stations collects radio communication information in the communication of the first method with the radio terminal stations and radio environment information about radio communication except own station, transmits the collected information to the control station, and receives, from the control station, transmission parameters in the communication of the second method with the radio terminal stations, and
the control station determines the transmission parameters in the communication of the second method between each of the radio base stations and the radio terminal stations based on the radio communication information and the radio environment information received from the plurality of radio base stations, and transmits the transmission parameters to the radio base stations,
wherein transmission parameters include all of a modulation level, a length of guard interval, a number of transmission streams, bandwidth, and an error method.

5. The transmission parameter control method according to claim 4, wherein the control station determines, as a transmission rate in the communication of the second method, a lowest transmission rate among transmission rates in the communication of the first method between each of the radio base stations and the radio terminal stations, and transmits the determined transmission rate to the radio base stations.

6. The transmission parameter control method according to claim 4, wherein transmission parameters include a transmission rate.

7. A control station controlling a plurality of radio base stations, each of the radio base stations performing, with a plurality of radio terminal stations, communication of a first method in which reception confirmation is enabled and communication of a second method in which reception confirmation is not possible, wherein the communication of the first method is unicast communication, and the communication of the second method is multicast communication or broadcast communication, the control station comprising:
a network communication unit configured to receive radio communication information in the communication of the first method between each of the radio base stations and the radio terminal stations and radio environment information about radio communication except the radio base stations, through a network, and to transmit transmission parameters in the communication of the second method between each of the radio base stations and the radio terminal stations, to the radio base stations through the network; and
an information processing unit configured to determine transmission parameters in the communication of the second method between each of the radio base stations and the radio terminal stations, based on the radio communication information and the radio environment information received from the plurality of radio base stations, and to transmit the determined transmission parameters to the radio base stations,
wherein transmission parameters include all of a modulation level, a length of guard interval, a number of transmission streams, bandwidth, and an error method.

8. The control station of claim 7, wherein the transmission parameters include a transmission rate.

* * * * *